United States Patent [19]

Albizzati et al.

[11] 4,315,836

[45] Feb. 16, 1982

[54] CATALYSTS FOR POLYMERIZING ALPHA-OLEFINS

[75] Inventors: Enrico Albizzati, Arona; Enzo Giannetti, Novara, both of Italy

[73] Assignee: Montedison, S.p.A., Milan, Italy

[21] Appl. No.: 137,256

[22] Filed: Apr. 4, 1980

Related U.S. Application Data

[63] Continuation of Ser. No. 10,238, Feb. 8, 1979, abandoned.

[30] Foreign Application Priority Data

Feb. 9, 1978 [IT] Italy ............................... 20096 A/78

[51] Int. Cl.$^3$ ................................................ C08F 4/64
[52] U.S. Cl. .................................. 252/429 B; 526/125
[58] Field of Search ..................................... 252/429 B

[56] References Cited

U.S. PATENT DOCUMENTS

| | | | |
|---|---|---|---|
| 3,549,717 | 12/1970 | Itakura et al. | 252/429 B X |
| 4,107,413 | 8/1978 | Giannini et al. | 252/429 B X |
| 4,107,416 | 8/1978 | Giannini et al. | 252/429 B X |
| 4,115,319 | 9/1978 | Scata et al. | 252/429 B |
| 4,124,532 | 11/1978 | Giannini et al. | 252/429 B |
| 4,149,990 | 4/1979 | Giannini et al. | 252/429 B |

*Primary Examiner*—Patrick Garvin

[57] ABSTRACT

New and improved catalysts for polymerizing alpha-olefins of formula $CH_2=CHR$ in which R is a $C_1$ to $C_6$ alkyl, more particularly propylene, mixtures of the alpha-olefins, and mixtures thereof with ethylene are disclosed. The catalysts are prepared from Al alkyl compounds and a solid product including a Mg dihalide and reaction products of said halide with at least one Ti compound and an electron donor compound which is an ester of an organic or inorganic oxygenated acid.

The improvement consists in providing catalysts prepared from components (a) and (b) as defined infra and component (b) of which includes an alkyl Al compound as defined in (b) in amounts equal to molar ratios between the alkyl Al compound and the Ti compound of component (a) in the range of from 1 to 30, preferably from 2 to 20, and in which if the alkyl Al compound is complexed with an electron donor compound, the latter is used in reduced amounts such that at least 85% of the alkyl Al compound is in a form not combined with an electron donor compound, i.e., catalysts which are highly active and highly stereospecific but which involve a lower consumption of alkyl Al compound with respect to the Ti compound than has been required in the case of various prior art catalysts and which make it possible to use a lower amount of electron-donor compound complexed with the Al alkyl compound.

29 Claims, No Drawings

CATALYSTS FOR POLYMERIZING ALPHA-OLEFINS

This is a continuation of application Ser. No. 10,238 filed Feb. 8, 1979 and now abandoned.

THE PRIOR ART

Processes for polymerizing alpha-olefins with catalysts comprising, as starting catalyst components, Al-alkyl compounds partially complexed with electron donor compounds and Ti compounds supported on Mg dihalides are known from British Pat. No. 1,387,890.

In the catalysts, according to the British patent, the electron donor compound is employed in amounts of from 5 to 100% by moles with respect to the Al-alkyl compound and higher than 300% with respect to the Ti compound. Al/Ti ratios higher than 10 are used, because if lower ratios are used, the catalytic activity decreases sensibly.

German published patent application No. 2,504,036 describes catalysts useful for polymerizing alpha-olefins and which comprise a Ti compound supported on a Mg dihalide and an Al-alkyl compound employed in relatively low Al/Ti ratios, equal to or lower than 10. The activity and stereospecificity of said catalysts are high only if the catalysts are utilized in the absence of hydrogen as molecular weight modifier. The activity, as well as the stereospecificity notably decreases when these catalysts are used in the presence of hydrogen.

German published patent application No. 2,643,143 describes catalysts improved with respect to those mentioned hereinbefore, which are endowed with high activity and stereospecificity if used as Al/Ti ratios higher than 30–40 and with amounts of electron donor compound higher than 20–30% by moles with respect to the Al-alkyl compound. On the other hand, if lower Al/Ti ratios are used, the activity remarkably decreases. It is not possible to employ amounts of electron donor compound lower than those indicated hereabove, as that results in a notable decrease in the stereospecificity of the catalyst. As to the electron donor compound, German application No. 2,643,143 does not suggest the use of amounts lower than 15% by moles with respect to the Al-alkyl compound.

The high activity and high stereospecificity catalysts of the types described hereinbefore permit, on one hand, to eliminate or to simplify the treatments for purifying the polymers from the catalyst residues, but, on the other hand, they involve the drawbacks consisting in a high consumption of Al-alkyl compound in respect of the Ti compound and in the necessity of using substantial amounts of electron donor compounds, the presence of which in the polymer is not always desirable.

THE PRESENT INVENTION

An object of this invention is to provide new and improved catalysts which are both highly active and highly stereospecific in the polymerization of the alpha-olefins $CH_2=CHR$ as defined herein, which involve a lower consumption of alkyl Al compound with respect to the Ti compound than has been required in the case of the prior art catalysts referred to above and in which an electron donor, if used, is effective in a reduced amount without appreciable decrease in the catalyst activity and stereospecificity even in the presence of hydrogen as molecular weight regulator of the polymer being produced.

This and other objects are accomplished by the catalysts of the present invention which represent an improvement over the prior art catalysts used for polymerizing the alphaolefins as defined, or mixtures thereof with ethylene, which catalysts are prepared by mixing at least the following two starting components:

(a) a solid product including a Mg dihalide and reaction products of said halide with at least a Ti compound preferably selected from the halides, alcoholates, halogen-alcoholates and carboxylates of Ti and an electron donor compound selected from the esters of organic and inorganic oxygenated acids, and in particular from the alkyl and aryl esters of the aromatic acids, of the halides, anhydrides and amides of said acids, of ethers ROR' and of ketones R COR', in which R and R', like or unlike each other, are alkyl, cycloalkyl or aryl radicals having 1 to 18 carbon atoms, the Mg/Ti ratio in said solid product being from 5 to 100, preferably from 10 to 50 and in particular from 15 to 25, the amount of compounds extractable with $TiCl_4$ at 80° C. from the solid product being less than 50% and preferably less than 20% of the Ti contained in the catalytic component, and the molar ratio between electron donor compound and Ti compound being comprised between 0.2 and 3, preferably between 1 and 2; and (b) an Al-alkyl compound selected from the Al trialkyls, the compounds containing two or more Al atoms bound to one another through an oxygen atom or a nitrogen atom, and the Al alkyl-aryloxy compounds of formula $AlR_{3-n}(OR')_n$, in which R is an alkyl group having 1 to 18 C, R' is an aryl group ortho-hindered in positions 2,6 with substituents capable of providing a steric hindrance higher than that of the group $—C_2H_5$, or a naphthyl group containing at least in position 2, a substituent capable of providing a steric hindrance higher than that of group $—C_2H_5$, n is a number from 1 to 2; said Al-alkyl compound being complexed for at least 20–30% with an electron donor compound preferably selected from the alkyl, aryl and cycloalkyl esters of aromatic acids.

The present improvement consists in using a catalyst component (b) in which the Al-alkyl compound as defined under (b) is used in amounts equal to molar ratios between Al-alkyl compound and Ti compound of component (a) in the range of from 1 to 30, preferably from 2 to 20, and in which if the alkyl Al compound is complexed with an electron donor compound, the latter is used in reduced amount such that at least 85% of the Al-alkyl compound is in a form not combined with an electron donor compound.

The ratio between the total moles of electron donor compound contained in component (a), and optionally in (b), and the moles of the Ti compound is lower than 5 and preferably is comprised between 1 and 3. When no electron donor compound is added to the Al-alkyl compound the ratio may be lower than 1 and correspond in practice to the ratio present in component (a).

The Ti compounds useful in the practice of this invention are, preferably, selected from the halides of tetravalent Ti, in particular $TiCl_4$, the halogen-alcoholates of tetravalent Ti, such as for example, $Ti(O\text{-}i\text{-}C_4H_9)_2Cl_2$ and $Ti(O\text{-}i\text{-}C_3H_7)_2Cl_2$, the Ti-carboxylates such as Ti acetate and Ti benzoate.

The electron donor compounds useful in preparing component (a) are selected, preferably, from the alkyl, aryl, and cycloalkyl esters of the aromatic carboxylic acids, in particular the esters of benzoic acid, such as, e.g., ethyl p-anisate, ethyl p-methoxybenzoate, methyl p-toluate or ethyl p-toluate, ethyl naphthoate, ethyl benzoate and butyl benzoate.

The derivatives of the aromatic acids specified hereinbefore are preferably used as halides, anhydrides and amides of the acids. As ethers and ketones it is possible to use n-butyl ether, diphenyl ether, ethyl-phenyl ether and benzophenone.

The electron donor compound reacted with the Al-alkyl compound of component (b) is selected, preferably, from the esters of the organic and inorganic oxygenated acids indicated for component (a). The esters of the aromatic acids are preferably utilized also for component (b).

Component (a) can be prepared according to different methods, a few of which are already known. For example, it can be prepared according to the methods described in the published German patent applications Nos. 2,643,143 and 2,735,672 corresponding respectively to the pending Luciani et al U.S. patent application Ser. No. 167,257 filed Jan. 28, 1980 and the Giannini et al application Ser. No. 822,547 filed Aug. 8, 1977, now U.S. Pat. No. 4,149,990, issued Apr. 17, 1979.

Other methods for preparing component (a) of the present catalysts are described in the pending United States application of Cecchin et al Ser. No. 134,773, filed Mar. 28, 1980 and in the pending United States application of Scata et al., Ser. No. 147,521, filed May 7, 1980.

Generally component (a) can be prepared by any method that leads to the formation of a product comprising, at least on its surface, a Mg dihalide and complexes thereof with at least a Ti compound and an electron donor compound selected from the class of compounds (esters, halides, acids, ethers and ketones) already cited, and in which the Mg/Ti ratio is comprised between 5 and 100 and the amount of Ti compounds extractable with TiCl$_4$ at 80° C. is lower than 50% and after such treatment the molar ratio between electron donor compound and Ti compound is from 0.2 to 3.

For instance, it is possible to employ methods based on the co-grinding (activation) of an anhydrous Mg chloride or bromide, containing less than 2% by weight of H$_2$O, with an electron donor compound selected from the classes mentioned above, employed in an amount of from 0.1 to 0.3 moles per mole of Mg halide under those conditions, in which the X-ray spectrum of the ground product shows a halo in a range of interplanar distances which includes that (distance) of the line of maximum intensity of the spectrum of powder of the normal, non-activated Mg halide and having the maximum intensity shifted with respect to such line. The term "spectrum of powder of the non-activated Mg halide" means the spectra as defined in ASTM sheets 3-0854 and 15-836 for MgCl$_2$ and MgBr$_2$, respectively. In the case of MgCl$_2$ the peak of the halo is comprised between 2.44 Å and 2.97 Å.

The product obtained by the co-grinding is reacted with TiCl$_4$ under conditions in which Ti compounds extractable with TiCl$_4$ at 80° C. remain in the reaction product in amounts not exceeding 50%. For example, the ground product is suspended in TiCl$_4$ and reacted at 60°–130° C. for stretches of time sufficient to fix at least 0.5% by weight of Ti, and then it is separated from TiCl$_4$ at temperatures at which there is no precipitation of Ti compounds insoluble in TiCl$_4$ at the separation temperature.

Another method of preparing component (a) of the present catalysts consists in reacting an adduct between a Mg dihalide and an alcohol or a phenol, generally containing more than 0.5 moles of organic compound per mole of halide and comprising, in combined form, from 0.1 to 0.5 moles of an electron donor compound selected from the classes of compounds cited hereinbefore (esters, halides, acids, amides, ethers, ketones), with a halogenated Ti compound liquid under the reaction conditions, in particular TiCl$_4$, and in separating from the reaction mixture a solid product the Ti compounds and electron donor compounds of which satisfy the conditions already specified for the catalysts of the present invention.

Still another method of preparing component (a) consists in preparing a Mg dihalide or a carrier containing said dihalide in an active form having a surface area larger than 80–100 m$^2$/g, in reacting said halide with an electron donor compound belonging to the classes disclosed supra in such amounts and under such conditions as to cause 0.1 to 0.3 moles per mole of dihalide to remain fixed in the halide, and then in reacting said product with a liquid Ti compound, in particular TiCl$_4$, under the conditions specified hereinabove for the preparation of other types of catalysts.

In preparing component (a) of these catalysts, it is also possible to simultaneously react the Ti compound and the electron donor compound with the activated Mg halide.

Mg dihalides in preactivated form are obtained, for example, by reacting an organo-magnesium compound of the type RMgX, or alcoholates of formula ROMgX', in which R is an alkyl or aryl radical having 1 to 18 C, X is a halogen and X' is a halogen or a radical OR, with a halogenating substance, such as halogenated Si compounds, in particular SiCl$_4$, SnCl$_4$, BCl$_3$, or Al halides such as AlCl$_3$, AlR$_2$Cl, AlRCl$_2$, in which R has the meaning specified.

It is also possible to obtain the Mg halides in an active form by evaporating, at a temperature up to about 200° C., solutions of the organo-magnesium compounds in ethers ROR', in which R and R', the same or different from one another, are alkyl, aryl and cycloalkyl radicals having 3 to 18 C, or by treating said solutions with anhydrous hydrogen halides in such amounts and conditions as to cause the magnesium dihalide to precipitate.

Other methods of preparing catalyst component (a) consist in reacting a Mg alcoholate such as, e.g., diethoxymagnesium or a halogen-alcoholate, such as for example, chloroethoxy-magnesium, chloro-phenoxymagnesium, chloro-butoxymagnesium, with the electron donor compound in such amounts and conditions, that the solid product of the reaction contains from 0.1 to 0.5 moles per gram atom of Mg, and in successively reacting said product with a Ti compound under the conditions already indicated for the preparation of the catalysts useful in the practice of this invention.

It is also possible, in preparing component (a), to react the Mg alcoholate with an anhydrous hydrogen halide, so as to form an adduct MgX$_2$.nROH, and to treat then the adduct as disclosed hereinabove. This reaction can be conducted in one step by reacting metal Mg, an alcohol ROH and a hydrogen halide, in which R has the significance as stated.

All of the methods disclosed lead to final products comprising, at least on their surface, a dihalide in active form and products of addition of said dihalides with the electron donor compound and the Ti compound.

The reaction of the Mg dihalide with the electron donor compound and the Ti compound can be established by I.R. and Raman spectroscopy.

In the preparation of component (a), the electron donor compound is generally reacted with the alkyl Al compound prior to the mixing thereof with the Ti compound. It is possible, however, to react the two compounds simultaneously, or the electron donor compound can be added after the Ti compound has been mixed with the alkyl Al compound.

The electron donor compound present in a combined form in component (a) of the present catalysts can be introduced, also, according to another embodiment of the present invention, by starting from a product as defined in (a), in the absence of an electron donor and then mixing such component (a) with an alkyl Al compound as defined in (b), wherein the Al/Ti ratio and the molar ratio between the electron donor compound complexed with the alkyl Al compound and the latter are selected in such manner that the solid reaction product contains an amount of electron donor compound corresponding to a molar ratio to the Ti compound of from 0.2 to 3. Also, the Al/Ti ratio between the free Al-alkyl compound and the Ti compound preferably ranges from 3 to 30. In the latter case, the reaction mixture can be directly utilized as polymerization catalyst.

Examples of trialkyl Al compounds useful as components (b) of the present catalysts includes: Al(C$_2$H$_5$)$_3$, Al(i-C$_4$H$_9$)$_3$, Al(n-C$_4$H$_9$)$_3$,

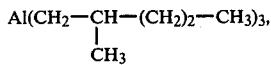

Al(C$_{12}$H$_{25}$)$_3$.

Examples of alkyl Al compounds containing two or more Al atoms bound to one another through an oxygen atom or a nitrogen atom which are useful in the practice of this invention include: (C$_2$H$_5$)$_2$Al-O-Al(C$_2$H$_5$)$_2$ and

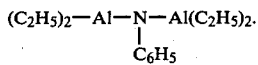

Such compounds can be prepared according to conventional methods by reaction of an Al trialkyl with water, ammonia or primary amines.

Examples of compounds AlR$_{3-n}$(OR')$_n$, wherein radical R' is an aryl group ortho-hindered in positions 2 and 6, in which at least one of the substituents is capable of giving a steric hindrance higher than that of the group —C$_2$H$_5$, or a naphthyl group consisting at least in position 2 a substituent with a steric hindrance higher than that of group —C$_2$H$_5$, include the following:
Al(C$_2$H$_5$)$_2$(2,6-di-tert.-butyl-p-cresoxy),
Al(i-C$_4$H$_9$)$_2$(2,6-di-tert.-butyl-p-cresoxy),
Al(C$_2$H$_5$)$_2$(2,6-di-tert.-butyl-phenoxy),
Al(C$_2$H$_5$) (2,6-di-tert.-butyl-p-cresoxy)$_2$,
Al(C$_2$H$_5$)$_2$ (2,8-di-tert.-butyl-naphthoxy).

The alkyl Al compounds can be employed in admixture with one another. It is also possible to use mixtures of said compounds with organometallic compounds of the metals belonging to Groups I–III, in particular compounds of Al, Zn, Mg and compounds of B, Si, which per se form with component (a) catalysts of little if any activity. Such compounds are utilized for protecting the catalyst, or the individual components thereof, from the impurities, if any, contained in the polymerization system (monomer, solvent, etc.). The use of such substances is particularly helpful in the case of the catalysts according to the present invention, in which, due to the small amounts of catalytic components employed, low amounts of impurities are sufficient to negatively affect the catalyst performance. Preferred compounds of this kind are: Zn(C$_2$H$_5$)$_2$, Al-alkyl-alkoxy compounds such as Al(i-C$_4$H$_9$)$_2$O-t-C$_4$H$_9$ and Al(C$_2$H$_5$)$_2$-xylenoxy. Such organometallic compounds are employed in amounts generally ranging from 1 to 20 moles per mole of alkyl Al compound. They may be utilized also in the form of complexes with electron donor compounds, in particular with the esters of the aromatic acids.

Polymerization of the alpha-olefins or mixtures thereof with ethylene with the catalysts of the present invention is carried out according to conventional methods, by operating either in liquid phase, the polymerization medium being the monomer itself, or in gaseous phase. The polymerization temperature is generally comprised between 40° and 90° C. The pressure can be atmospheric pressure or a higher pressure.

The alpha-olefins can be polymerized in admixture with ethylene, in particular in such ratios that the polymerized ethylene content is from 1 to 25% by weight.

The catalysts of this invention can be also used to produce polymers, in particular polypropylene, having improved characteristics of resistance to brittleness, conforming to known methods in which at first the alpha-olefin is polymerized until about 60–80% of the total polymer is formed and then, in one or more steps, ethylene and/or mixtures thereof with the alpha-olefin are polymerized, in order that the polymerized ethylene content is from 5 to 30% by weight.

The following examples are given to illustrate the present invention in more detail and are not intended to be limiting.

EXAMPLE 1

0.63 millimoles of Al triisobutyl were reacted at 25° C. with 0.047 millimoles of methyl p-toluate in 80 ml of anhydrous and desulphurated n-heptane for 5 minutes. 50 ml of the resulting solution were contacted with a solid catalyst component prepared according to Example 7 of published German patent application No. 2,643,143 and used in the amount indicated in Table I, to obtain a suspension.

The remaining 30 ml of the solution were diluted to 1000 ml with n-heptane and introduced, under a nitrogen pressure, into a 3000 ml steel autoclave equipped with a magnetic anchor stirrer and a thermometer, thermoregulated at 40° C., and into which a flow of propylene was introduced.

Successively, and in the same way, the catalytic component suspension was introduced. After closing the autoclave, it was heated to 60° C. while simultaneously feeding propylene in to a total pressure of 5 atm. Such pressure was kept constant throughout the polymerization by continuously feeding the propylene. After 4 hours, the polymerization was stopped and the polypropylene was isolated by treatment with methanol and acetone. The results of the polymerization test are recorded in Table I.

EXAMPLE 2

0.63 millimoles of Al triisobutyl were reacted at 25° C. with 0.041 millimoles of methyl p-toluate in 80 ml of anhydrous and desulphurated n-heptane for 5 minutes. 50 ml of the resulting solution were contacted with a solid catalytic component prepared according to the modalities of Example 31 of Belgian Pat. No. 857,574 (corresponding to U.S. Pat. No. 4,149,990 issued Apr. 17, 1979) and having a Ti content equal to 1.62% by weight. The amount used is recorded in Table I.

The remaining 30 ml of the solution were diluted to 1000 ml with n-heptane and were introduced, under a nitrogen pressure, into a steel 3000 ml autoclave equipped with a magnetic anchor stirrer and a thermometer, thermoregulated at 40° C., and into which a flow of propylene was introduced.

In the same may, the catalytic component suspension was then introduced. After closing the autoclave, it was heated to 60° C. and simultaneous feeding of propylene up to a total pressure of 5 atm was continued. Such pressure was kept constant throughout the polymerization by feeding of the propylene. After 4 hours, the polymerization was stopped and the polypropylene was isolated by treatment with methanol and acetone.

The results of the polymerization are recorded in Table I.

EXAMPLE 3

0.63 millimoles of Al triisobutyl were dissolved in 80 ml of (anhydrous desulphurated) n-heptane, 50 ml of such solution were contacted with a solid catalytic component (the amount is specified in Table I) prepared according to Example 2, in which, instead of ethyl benzoate, an equivalent amount of methyl p-toluate was used.

The remaining 30 ml were diluted to 1000 ml with n-heptane and were introduced, under a nitrogen pressure, into a steel 3000 ml autoclave equipped with a magnetic anchor stirrer and a thermometer, thermoregulated at 40° C., and into which propylene was made to flow.

Successively, the catalytic component suspension was introduced in the same manner. After closing the autoclave, it was heated to 60° C. while simultaneously feeding in propylene up to a total pressure of 5 atm. Such pressure was kept constant throughout the polymerization by continuing the monomer feed. After 4 hours, the polymerization was stopped and the polypropylene was isolated by treatment with methanol and acetone.

The results relating to the polymerization test are recorded in Table I.

EXAMPLE 4

0.75 millimoles of Al triisobutyl were dissolved in 80 ml of (anhydrous desulphurated) n-heptane, 50 ml of such solution were contacted with a solid catalytic component prepared according to Example 2 (its amount is recorded in Table I), with the exception that methyl benzoate was substituted by ethyl p-anisate.

The remaining 30 ml were diluted to 1000 ml with n-heptane and were introduced, under a nitrogen pressure, into a 3000 ml steel autoclave equipped with a magnetic anchor stirrer and a thermometer, thermoregulated at 40° C., and into which propylene was made to flow.

Successively, the catalytic component suspension was introduced in the same manner. After having closed the autoclave, it was heated to 60° C. while simultaneously feeding in propylene up to a total pressure of 5 atm. Such pressure was kept constant throughout the polymerization by continuously feeding the monomer. After 4 hours the polymerization was stopped and the polypropylene was isolated by treatment with methanol and acetone.

The results of the polymerization test are recorded in Table I.

EXAMPLE 5

0.75 millimoles of Al triisobutyl were dissolved in 80 ml of (anhydrous desulphurated) n-heptane. 50 ml of such solution were contacted with a solid catalytic component prepared according to Example 4 and used in the amount specified in Table I.

The remaining 30 ml were diluted to 1000 ml with n-heptane and introduced, under a nitrogen pressure, into a 3000 ml steel autoclave equipped with a magnetic anchor stirrer and a thermometer, thermoregulated at 40° C., and into which propylene was made to flow.

Successively, and in the same way, the catalytic component suspension was introduced. After having closed the autoclave, it was heated to 60° C. and 0.1 atm of $H_2$ and propylene were introduced up to a total pressure of 5 atm. Such pressure was kept constant throughout the polymerization by continuously feeding the monomer. After 4 hours the polymerization was stopped and the polypropylene was isolated by treatment with methanol and acetone.

The results of the polymerization test are recorded in Table I.

EXAMPLE 6

0.40 millimoles of Al triisobutyl were reacted at 25° C. with 0.04 millimoles of methyl p-toluate in 80 ml of (anhydrous desulphurated) n-heptane for 5 minutes. 50 ml of such solution were contacted with a solid catalyst component prepared according to Example 1 and used in the amount reported in Table I.

The remaining 30 ml were diluted to 1000 ml with n-heptane containing 2.5 millimoles of $Zn(n-C_4H_9)_2$ and introduced, under a nitrogen pressure, into a 3000 ml steel autoclave equipped with a magnetic anchor stirrer and a thermometer, thermoregulated at 40° C., and into which propylene was made to flow.

Successively, and in the same way, the catalytic component suspension was introduced. After having closed the autoclave, it was heated to 60° C. while simultaneously feeding in propylene up to a total pressure of 5 atm. Such pressure was kept constant throughout the polymerization by continuously feeding the monomer. After 4 hours the polymerization was stopped and the polypropylene was isolated by treatment with methanol and acetone.

The results of the polymerization test are recorded in Table I.

EXAMPLE 7

0.19 millimoles of Al triisobutyl were dissolved in 80 ml of (anhydrous desulphurated) n-heptane. 50 ml of such solution were contacted with a solid catalyst component prepared according to Example 1 and used in the amount indicated in Table I. The remaining 30 ml were diluted to 1000 ml with n-heptane containing 2.5 millimoles of $Zn(n-C_4H_9)_2$ and were introduced, under a nitrogen pressure, into a 3000 ml steel autoclave equipped with a magnetic anchor stirrer and a thermometer, thermoregulated at 40° C., into which propylene was caused to flow.

Successively, and in the same way, the catalytic component suspension was introduced. After having closed the autoclave, it was heated to 60° C. with simultaneous feeding of propylene up to a total pressure of 5 atm. Such pressure was kept constant throughout the polymerization by continuously feeding the monomer. After 4 hours the polymerization was stopped and the polypropylene was isolated by treatment with methanol and acetone.

The results of the polymerization test are recorded in Table I.

EXAMPLE 8

0.63 millimoles of Al triisobutyl were reacted at 25° C. with 0.041 millimoles of methyl p-toluate in 80 ml of (anhydrous desulphurated) n-heptane for 5 minutes. 50 ml of such solution were contacted with a solid catalyst component prepared according to Example 24 of U.S. patent application Ser. No. 134,773 filed Mar. 28, 1980 and used in the amount recorded in Table I.

The remaining 30 ml were diluted to 1000 ml with n-heptane and introduced, under a nitrogen pressure, into a 3000 ml steel autoclave equipped with a magnetic anchor stirrer and a thermometer, thermoregulated at 40° C., and into which propylene was caused to flow.

Successively, and in the same way, the catalytic component suspension was introduced. After having closed the autoclave, it was heated to 60° C. with simultaneous feeding of propylene up to a total pressure of 5 atm. Such pressure was kept constant throughout the polymerization by continuously feeding the monomer. After 4 hours the polymerization was stopped and the polypropylene was isolated by treatment with methanol and acetone.

The results relating to the polymerization test are recorded in Table I.

EXAMPLE 9

0.113 millimoles of Al triisobutyl were dissolved in 80 ml of (anhydrous desulphurated) n-heptane. 50 ml of such solution were contacted with a solid catalytic component prepared according to Example 2 and used in the amount indicated in Table I. The remaining 30 ml were diluted to 1000 ml with n-heptane containing 2.5 millimoles of $(C_2H_5)_2Al$ $[OC_6H_3(CH_3)_2]$ and introduced, under a nitrogen pressure, into a 3000 ml steel autoclave equipped with a magnetic anchor stirrer and a thermometer, thermoregulated at 40° C., and into which propylene was made to flow.

Successively, and in the same way, the catalytic component suspension was introduced. After having closed the autoclave, it was heated to 60° C. while simultaneously feeding in propylene up to a total pressure of 5 atm. Such pressure was kept constant throughout the polymerization by continuously feeding the monomer. After 4 hours the polymerization was stopped and the polypropylene was isolated by treatment with methanol and acetone.

The results of the polymerization test are recorded in Table I.

EXAMPLE 10

0.63 millimoles of Al-triisobutyl were reacted at 25° C. with 0.041 millimoles of methyl p-toluate in 80 ml of (anhydrous desulphurated) n-heptane for 5 minutes. 50 ml of such solution were contacted with a solid catalyst component prepared according to Example 13 of U.S. patent application Ser. No. 147,521 filed May 7, 1980 and used in the amount specified in Table I. The remaining 30 were diluted to 1000 ml with n-heptane and introduced, under a nitrogen pressure, into a 3000 ml steel autoclave equipped with a magnetic anchor stirrer and a thermometer, thermoregulated at 40° C., and into which propylene was made to flow.

Successively, and in the same way, the catalytic component suspension was introduced. After having closed the autoclave, it was heated to 60° C. while simultaneously feeding in propylene up to a total pressure of 5 atm. Such pressure was kept constant throughout the polymerization by continuously feeding the monomer. After 4 hours the polymerization was stopped and the polypropylene was isolated by treatment with methanol and acetone.

The results of the polymerization test are recorded in Table I.

EXAMPLE 11

0.65 millimoles of $(C_2H_5)_2Al$ $[OC_6H_2(t-C_4H_9)_2OCH_3]$ were dissolved in 80 ml of (anhydrous desulphurated) n-heptane. 50 ml of such solution were contacted with a solid catalytic component prepared according to Example 31 of Belgian Pat. No. 857,574 (corresponding to U.S. Pat. No. 4,149,990 issued Apr. 17, 1979), while suitably varying conditions in order to a have a titanium content equal to 1.7% and an ethyl benzoate content equal to 6.5% by weight.

The remaining 30 ml were diluted to 1000 ml with n-heptane and introduced, under a nitrogen pressure, into a 3000 ml steel autoclave equipped with a magnetic anchor stirrer and a thermometer, thermoregulated at 40° C., and into which propylene was made to flow.

Successively, and in the same way, the catalytic component suspension was introduced. After having closed the autoclave, it was heated to 60° C. while simultaneously feeding in propylene up to a total pressure of 5 atm. Such pressure was kept constant throughout the polymerization by continuously feeding the monomer. After 4 hours the polymerization was stopped and the polypropylene was isolated by treatment with methanol and acetone.

The results relating to the polymerization test are recorded in Table I.

TABLE I

| EXAMPLE NO. | CATALYTIC COMPONENT | | | | $Al/_{Ti}$ molar ratio | $DONOR/_{Ti}$ molar ratio | YIELD Kg $PP/_{gTi}$ | HEPTANE RESIDUE % | $\eta$ inh. dl/g |
|---|---|---|---|---|---|---|---|---|---|
| | mg | Ti % | DONOR % | Type | | | | | |
| 1 | 218 | 1.55 | 6.7 | EB | 9.1 | 2.07 | 197 | 89 | 2.24 |
| 2 | 201 | 1.62 | 10.2 | EB | 9.4 | 2.06 | 180 | 90.5 | 1.82 |
| 3 | 264 | 1.31 | 11.7 | EPT | 9.1 | 2.86 | 250 | 91.8 | 2.44 |
| 4 | 295 | 1.4 | 7.2 | EPA | 9.5 | 1.66 | 117 | 89 | 3.37 |
| 5 | 343 | 1.4 | 7.2 | EPA | 9.5 | 1.66 | 87 | 85 | 1.86 |

TABLE I-continued

| EXAMPLE NO. | CATALYTIC COMPONENT | | | | Al/$Ti$ molar ratio | DONOR/$Ti$ molar ratio | YIELD Kg PP/$gTi$ | HEPTANE RESIDUE % | $\eta$ inh. dl/g |
|---|---|---|---|---|---|---|---|---|---|
| | mg | Ti % | DONOR % | Type | | | | | |
| 6 | 217 | 1.55 | 6.7 | EB | 5.7 | 2. | 200 | 91 | 2.12 |
| 7 | 287 | 1.55 | 6.7 | EB | 2. | 1.38 | 60 | 92 | 2.34 |
| 8 | 290 | 2.01 | 8. | BB | 9. | 1.75 | 149 | 89.3 | 2.10 |
| 9 | 70 | 1.55 | 6.7 | EB | 5. | 1.38 | 160 | 90 | 1.50 |
| 10 | 150 | 2.13 | 7.6 | EB | 9.5 | 2.6 | 179 | 90 | 1.98 |
| 11 | 187 | 1.7 | 6.5 | EB | 9. | 1.22 | 252 | 86 | 2.11 |

EB = ethyl benzoate
BB = butyl benzoate
EPT = ethyl p-toluate
EPA = ethyl p-anisate

EXAMPLES 12, 13 AND 14

Polymerization of propylene at atmospheric pressure 450 ml of anhydrous and desulphurated n-heptane and 1.25 millimoles of aluminum alkyl-alcoholate were introduced, while flowing in propylene, into a cylindrical glass reactor having a 1 liter volume and equipped with a stirrer, a thermometer and a plunging pipe for the gas inflow. The whole was brought to a temperature of 60° C. and heptane was saturated with the monomer for 10 minutes. After this time period, 50 ml of heptane suspension containing a proper amount of (a) solid catalytic component (equal to about 0.12 millimoles/titanium liter) prepared according to Example 11, and of (b) aluminum triisobutyl were added. Polymerization was carried out at 60° C. under normal pressure; after 1 hour the reaction was stopped with ethanol.

The results relating to the polymerization test conducted under such conditions, varying the aluminum alkylalcoholate or employing an aluminum trialkyl reacted with Si(OC$_2$H$_5$)$_4$, are recorded in Table II.

TABLE II

| EXAMPLE NO. | ALUMINUM COMPOUND Type | Amount | Al/$Ti$* molar ratio | YIELD kg PP/$gTi$ | HEPTANE RESIDUE % | $\eta$ inh. dl/g |
|---|---|---|---|---|---|---|
| 12 | Al(i-C$_4$H$_9$)$_2$(O-t-C$_4$H$_9$) | 2.5 mM/l | 4 | 13.5 | 91. | 2.14 |
| 13 | Al(i-C$_4$H$_9$)$_2$BHT** | 2.5 mM/l | 4 | 15. | 86.3 | 1.75 |
| 14 | Al(C$_2$H$_5$)$_3$ . 0,3Si(OC$_2$H$_5$)$_4$ | 2.5 mM/l | — | 6.8 | 95.3 | 2.52 |

*Al of Al (i-C$_4$H$_9$)$_3$
**2,6-di-t-butyl-p-cresoxy

EXAMPLE 15

1 millimole of aluminum triisobutyl were reacted at 25° C. with 0.09 millimoles of methyl p-toluate in 80 ml of (anhydrous desulphurated) n-heptane for 5 minutes. 50 ml of such solution were contacted with a proper amount of the solid catalytic component described in Example 11, in such a way as to obtain an Al/Ti molar ratio equal to 20 and a donor/Ti molar ratio equal to 2.9.

The remaining 30 ml of the solution were diluted to 1000 ml with n-heptane and introduced, under a nitrogen pressure, into a 3000 ml steel autoclave equipped with a magnetic anchor stirrer and a thermometer, thermoregulated at 40° C., and into which propylene was made to flow.

Successively, the catalytic component suspension was introduced in the same manner. After having closed the autoclave, it was heated to 60° C. and 0.1 atm of H$_2$ and propylene up to a total pressure of 5 atm were introduced. Such pressure was kept constant throughout the polymerization by continuously feeding the monomer. After 4 hours the polymerization was stopped and, by treatment with methanol and acetone, a polypropylene amount corresponding to a yield of 250 kg/g of Ti, having a $\eta=2.0$ dl/g and a residue of the extraction thereof with heptane equal to 91.3% was isolated.

EXAMPLE 16

Example 15 was repeated using aluminum triethyl instead of aluminum triisobutyl, but keeping the molar ratios unchanged.

A polypropylene amount corresponding to a yield of 182 kg/g of Ti, having a $\eta=2.20$ dl/g and a residue after the extraction thereof with heptane of 94.8% was obtained.

Comparison examples 1 to 4 and 7 to 9 are given to show the poor results, with reference in particular to the stereospecificity of the catalyst, which are obtained with catalysts of prior art in which the Al/Ti ratio and the amount of Al-alkyl compound not complexed with an electron-donor fall within the ranged used with catalysts belonging to this invention.

Comparison examples 5 to 6 refer to catalysts the component (a) of which is the same as the one used in the catalysts of this invention: the Al/Ti and Ti/donor ratios are, however, different and representative of the values used in the catalysts of prior art.

COMPARISON EXAMPLE 1

1 millimole of Al triisobutyl was dissolved in 80 ml of (anhydrous desulphurated) n-heptane. 50 ml of such solution were contacted with the solid catalytic component prepared according to Example 2 of British Pat. No. 1,387,890, with a titanium content equal to 5% by weight and used in the amount indicated in Table III.

The remaining 30 ml of the solution were diluted to 1000 ml with n-heptane and introduced, under a nitrogen pressure, into a 3000 ml steel autoclave equipped with a magnetic anchor stirrer and a thermometer, thermoregulated at 40° C., and into which propylene was made to flow.

Successively, and in the same way, the catalytic component suspension was introduced. After having closed the autoclave, it was heated to 60° C. while simultaneously feeding in propylene up to a total pressure of 5 atm. Such pressure was kept constant throughout the polymerization by continuously feeding the monomer. After 4 hours the polymerization was stopped and the polypropylene was isolated by treatment with methanol and acetone.

The results relating to the polymerization test are recorded in Table III.

COMPARISON EXAMPLE 2

1.0 millimole of Al triisobutyl was reacted at 25° C. with 0.15 millimoles of methyl p-toluate in 80 ml of (anhydrous desulphurated) n-heptane for 5 minutes. 50 ml of such solution were contacted with the solid catalyst component prepared according to Comparison Example 1, used in the amount indicated in Table III.

The remaining 30 ml of the solution were diluted to 1000 ml with n-heptane and introduced, under a nitrogen pressure, into a 3000 ml steel autoclave equipped with a magnetic anchor stirrer and a thermometer, thermoregulated at 40° C., and into which propylene was made to flow.

Successively, and in the same way, the catalytic component suspension was introduced. After having closed the autoclave, it was heated to 60° C. while simultaneously feeding propylene up to a total pressure of 5 atm. Such pressure was kept constant throughout the polymerization by going on feeding the monomer. After 4 hours the polymerization was stopped and the polypropylene was isolated by treatment with methanol and acetone.

The results relating to the polymerization test are recorded in Table III.

COMPARISON EXAMPLE 3

1.3 millimoles of Al triisobutyl were dissolved in 80 ml of (anhydrous desulphurated) n-heptane. 50 ml of such solution were contacted with the amount of solid catalytic component indicated in Table III, prepared according to Comparison Example 1 and having a titanium content equal to 2.64% by weight.

The remaining 30 ml were diluted to 1000 ml with n-heptane and introduced, under a nitrogen pressure, into a 3000 ml steel autoclave equipped with a magnetic anchor stirrer and a thermometer, thermoregulated at 40° C., and into which propylene was made to flow.

Successively, and in the same way, the catalytic component suspension was introduced. After having closed the autoclave, it was heated to 60° C. while simultaneously feeding propylene up to a total pressure of 5 atm. Such pressure was kept constant throughout the polymerization by continuously feeding the monomer. After 4 hours the polymerization was stopped and the polypropylene was isolated by treatment with methanol and acetone.

The results relating to the polymerization test are recorded in Table III.

COMPARISON EXAMPLE 4

2.45 millimoles of Al triisobutyl were reacted at 25° C. with 0.49 millimoles of metyl p-toluate in 80 ml of (anhydrous desulphated) n-heptane for 5 minutes. 50 ml of such solution were contacted with the solid catalyst component prepared according to Comparison Example 3 and used in the amount shown in Table III.

The remaining 30 ml were diluted to 1000 ml with n-heptane and introduced, under a nitrogen pressure, into a 3000 ml steel autoclave equipped with a magnetic anchor stirrer and a thermometer, thermoregulated at 40° C., and into which propylene was made to flow.

Successively, and in the same way, the catalytic component suspension was introduced. After having closed the autoclave, it was heated to 60° C. while simultaneously feeding propylene up to a total pressure of 5 atm. Such pressure was kept constant throughout the polymerization by continuously feeding the monomer. After 4 hours the polymerization was stopped and the polypropylene was isolated by treatment with methanol and acetone.

The results relating to the polymerization test are recorded in Table III.

COMPARISON EXAMPLE 5

5.0 millimoles of Al triisobutyl were reacted at 25° C. with 1.3 millimoles of methyl p-toluate in 80 ml of (anhydrous desulphurated) n-heptane for 5 minutes. 50 ml of such solution were contacted with the solid catalytic component employed in Example 1, used in the amount reported in Table III.

The remaining 30 ml of the solution were diluted to 1000 ml with n-heptane and introduced, under a nitrogen pressure, into a 3000 ml steel autoclave equipped with a magnetic anchor stirrer and a thermometer, thermoregulated at 40° C., and into which propylene was made to flow.

Successively, and in the same way, the catalytic component suspension was introduced. After having closed the autoclave, it was heated to 60° C. while simultaneously feeding in propylene up to a total pressure of 5 atm. Such pressure was kept constant throughout the polymerization by continuously feeding the monomer. After 4 hours, the polymerization was stopped and the polypropylene was isolated by treatment with methanol and acetone.

The results relating to the polymerization test are recorded in Table III.

COMPARISON EXAMPLE 6

5.0 millimoles of Al triisobutyl were reacted at 25° C. with 1.5 millimoles of methyl p-toluate in 80 ml of (anhydrous desulphurated) n-heptane for 5 minutes. 50 ml of such solution were contacted with the solid catalytic component employed in Example 2, used in the amount shown in Table III.

The remaining 30 ml were diluted to 1000 ml with n-heptane and introduced, under a nitrogen pressure, into a 3000 ml steel autoclave equipped with a magnetic anchor stirrer and a thermometer, thermoregulated at 40° C., and into which propylene was caused to flow.

Successively, and in the same way, the catalytic component suspension was introduced. After having closed the autoclave, it was heated to 60° C. while simultaneously feeding propylene in up to a total pressure of 5 atm. Such pressure was kept constant throughout the polymerization by continuously feeding the monomer. After 4 hours the polymerization was stopped and the polypropylene was isolated by treatment with methanol and acetone.

The results relating to the polymerization test are shown in Table III.

COMPARISON EXAMPLE 7

0.38 millimoles of Al triisobutyl were dissolved in 80 ml of (anhydrous desulphurated) n-heptane. 50 ml of such solution were contacted with the solid catalytic component prepared according to comparison Example 5 and used in the amount reported in Table III.

The remaining 30 ml were diluted to 1000 ml with n-heptane and introduced, under a nitrogen pressure, into a 3000 ml steel autoclave equipped with a magnetic anchor stirrer and a thermometer, thermoregulated at 40° C., and into which propylene was made to flow.

Successively, and in the same way, the catalytic component suspension was introduced. After having closed the autoclave, it was heated to 60° C. while simultaneously feeding propylene in up to a total pressure of 5 atm. Such pressure way kept constant throughout the polymerization by continuously feeding the monomer. After 4 hours the polymerization was stopped and the polypropylene was isolated by treatment with methanol and acetone.

The results relating to the polymerization test are recorded in Table III.

COMPARISON EXAMPLE 8

0.38 millimoles of Al triisobutyl were dissolved in 80 ml of (anhydrous desulphurated) n-heptane. 50 ml of such solution were contacted with the solid catalytic component prepared according to Example 1 of published German Patent Application No. 2,504,036 and used in the amount recorded in Table III. The remaining 30 ml were diluted to 1000 ml with n-heptane and were introduced, under a nitrogen pressure, into a 3000 ml steel autoclave equipped with a magnetic anchor stirrer and a thermometer, thermoregulated at 40° C., and into which propylene was made to flow.

Successively, the catalytic component suspension was introduced in the same way. After having closed the autoclave, it was heated to 60° C. while simultaneously feeding in propylene up to a pressure of 4.8 atm and $H_2$ up to 5 atm. Such pressure was kept constant throughout the polymerization by continuous feed of the monomer. After 4 hours the polymerization was stopped and the polypropylene was isolated by treatment with methanol and acetone.

The results relating to the polymerization test are recorded in Table III.

COMPARISON EXAMPLE 9

Example 15 was repeated varying the molar ratios as follows: Al/Ti=40; electron-donor/Ti=2.9. After a polymerization time of 30 minutes, an amount of polypropylene was isolated corresponding to a yield of 250 kg/g of Ti having an inherent $\eta=1.62$ dl/g and a residue after extraction thereof with heptane of 76.5%.

with ethylene, comprising the product of the reaction between the following two components:

(a) a solid product comprising a Mg dihalide and complexes of said halide with at least a compound of tetravalent Ti selected from the group consisting of the halides, haloalcoholates and organic carboxylates and a hydrocarbyl electrondonor compound selected from the group consisting of alkyl, aryl and cycloalkyl esters of the organic and inorganic oxygenated acids, the anhydrides, halides, and amides of said acids, ethers ROR' and ketones RCOR', in which R and R', the same or different from one another, are alkyl, cycloalkyl or aryl radicals having 1 to 18 carbon atoms; in which the Mg/Ti ratio between Mg dihalide and Ti compound ranges from 5 to 100, the amount of Ti compound extractable with $TiCl_4$ at 80° C. is lower than 50% and the molar ratio between electron-donor compound and Ti compound ranges, after extraction with $TiCl_4$, from 0.2 to 3, and (b) an Al alkyl compound selected from the group consisting of trialkyls, the Al alkyl compounds containing two or more Al atoms bound to one another through an oxygen atom or a nitrogen atom, and compounds $AlR_{3-n}(OR')_n$, in which R is an alkyl radical having 1 to 18 carbon atoms, R' is an aryl radical ortho-hindered in positions 2,6 with substituents capable of giving a steric hindrance higher than that of the group $—C_2H_5$, or a naphthyl group containing at least in position 2 a substituent with a steric hindrance higher than that of the group $—C_2H_5$, and n is a number comprised in the range from 1 to 2; said Al alkyl compound being present for at least 85% in a non-combined form with an electron-donor compound and being employed in amounts corresponding to a molar ratio to the Ti compound of component (a) ranging from 1 to 30.

2. Catalysts according to claim 1, in which the Mg/Ti ratio between Mg dihalide and Ti compound ranges from 10 to 50.

3. Catalysts according to claim 1, in which the Mg/Ti ratio between Mg dihalide and Ti compound ranges from 15 to 25.

4. Catalysts according to claim 1, in which the molar ratio between the electron donor compound and Ti compound ranges, after the extraction with $TiCl_4$, from 1 to 2.

5. Catalysts according to claim 1, in which the Al alkyl compound of component (b) is employed in

TABLE III

| COMPARISON EXAMPLE NO. | CATALYTIC COMPONENT | | | | Al/Ti molar ratio | DONOR/Ti molar ratio | YIELD Kg PP/gTi | HEPTANE RESIDUE % | $\eta$ inh. dl/g |
|---|---|---|---|---|---|---|---|---|---|
| | mg | Ti % | DONOR % | Type | | | | | |
| 1 | 83.1 | 5. | 15.6 | EB | 10 | 1. | 38.5 | 46.2 | 1.24 |
| 2 | 80. | 5. | 15.6 | EB | 10 | 2.5 | 12.5 | 67. | 3.1 |
| 3 | 508. | 2.64 | 8.24 | EB | 4.5 | 1. | 49. | 70. | 1.54 |
| 4 | 500. | 2.64 | 8.24 | EB | 9. | 2.8 | 21. | 86. | 2.63 |
| 5 | 59. | 1.55 | 6.7 | EB | 260. | 69. | 198. | 93.4 | 1.79 |
| 6 | 42. | 1.62 | 10.2 | EB | 180. | 53. | 330. | 90. | 1.77 |
| 7 | 53. | 4.2 | 17. | EB | 9. | 1.29 | 65. | 87.3 | 2.4 |
| 8 | 58. | 4.2 | 17. | EB | 9. | 1.29 | 12.2 | 73. | 1.11 |

EB = ethyl benzoate

What we claim is:

1. Catalysts for polymerizing alpha-olefins $CH_2=CHR$, in which R is an alkyl radical having 1 to 6 carbon atoms, mixtures thereof and mixtures thereof amounts corresponding to a molar ratio to the Ti compound of component (a) ranging from 2 to 20.

6. Catalysts according to claim 1, in which the Mg/Ti ratio between the Mg dihalide and Ti compound ranges from 15 to 25, the molar ratio between electron donor compound and Ti compound ranges, after the extraction with TiCl$_4$, from 1 to 2, and the Al alkyl compound of component (b) is employed in amounts corresponding to a molar ratio to the Ti compound of component (a) ranging from 2 to 20.

7. Catalysts according to claim 1, in which component (b) comprises, in a combined form with the Al alkyl compound, an electron donor compound selected from the group consisting of the esters of the organic and inorganic oxygenated acids in amounts up to 10% by moles with respect to the Al alkyl compound, and in which the molar ratio between the total amount of the electron donor compound contained in components (a) and (b) and the Ti compound is comprised between 1 and 5.

8. Catalysts according to claim 1, in which component (b) comprises, in addition to the Al alkyl compound, an organometallic compound of Al different from the Al alkyl compounds as defined in (b), or an organometallic compound of an element selected from the group consisting of Zn, Mg, B and Si.

9. Catalysts according to claim 1, in which the Ti compound is TiCl$_4$.

10. Catalysts according to claim 1, in which the hydrocarbyl electron-donor compound is methyl p-toluate.

11. Catalysts according to claim 1, in which the Al alkyl compound is Al triisobutyl.

12. Catalysts according to claim 1, in which the Al alkyl compound is Al triethyl.

13. Catalysts according to claim 1, in which the Al alkyl compound is Al(C$_2$H$_5$)$_2$-(2,6-di-tert.-butyl-p-cresoxy).

14. Catalysts according to claim 1, in which the Ti compound is TiCl$_4$, the hydrocarbyl electron-donor compound is methyl p-toluate, and the Al alkyl compound is Al triisobutyl, Al triethyl, or Al(C$_2$H$_5$)$_2$-(2,6-di-tert.-butyl-p-cresoxy).

15. Catalysts for polymerizing alpha-olefins CH$_2$=CHR, in which R is an alkyl radical having 1 to 6 carbon atoms, mixtures thereof and mixtures thereof with ethylene, comprising the product of the reaction between the following two components:
(a) a solid product comprising a Mg dihalide and complexes of said halide with at least a compound of tetravalent Ti selected from the group consisting of the halides, haloalcoholates and organic carboxylates and a hydrocarbyl electrondonor compound selected from the group consisting of alkyl, aryl and cycloalkyl esters of the organic and inorganic oxygenated acids, the anhydrides, halides, and amides of said acids, ethers ROR' and ketones RCOR', in which R and R', the same or different from one another, are alkyl, cycloalkyl or aryl radicals having 1 to 18 carbon atoms; in which the Mg/Ti ratio between Mg dihalide and Ti compound ranges from 5 to 100, the amount of Ti compound extractable with TiCl$_4$ at 80° C. is lower than 50% and the molar ratio between electron-donor compound and Ti compound ranges, after extraction with TiCl$_4$, from 0.2 to 3, and
(b) an Al alkyl compound selected from the group consisting of Al trialkyls, Al alkyl compounds containing two or more Al atoms bound to one another through an oxygen atom or a nitrogen atom, and compounds AlR$_{3-n}$(OR')$_n$, in which R is an alkyl radical having 1 to 18 carbon atoms, R' is an aryl radical ortho-hindered in positions 2,6 with substituents capable of giving a steric hindrance higher than that of the group —C$_2$H$_5$, or a naphthyl group containing at least in position 2 a substituent with a steric hindrance higher than that of the group —C$_2$H$_5$, and n is a number comprised in the range from 1 to 2; said Al alkyl compound being used free from electron-donor compounds and being employed in amounts corresponding to a molar ratio to the Ti compound of component (a) ranging from 1 to 30.

16. Catalysts according to claim 15, in which the Mg/Ti ratio between Mg dihalide and Ti compound ranges from 10 to 50.

17. Catalysts according to claim 15, in which the Mg/Ti ratio between Mg dihalide and Ti compound ranges from 15 to 25.

18. Catalysts according to claim 15, in which the Al alkyl compound of component (b) is employed in amounts corresponding to a molar ratio to the Ti compound of component (a) ranging from 2 to 20.

19. Catalysts according to claim 15, in which the Ti compound is TiCl$_4$.

20. Catalysts according to claim 15, in which the Al alkyl compound is Al triisobutyl.

21. Catalysts according to claim 15, in which the Al alkyl compound is Al triethyl.

22. Catalysts according to claim 15, in which the alkyl compound is Al(C$_2$H$_5$)$_2$ (2,6-di-tert.-butyl-p-cresoxy).

23. Catalysts according to claim 15, in which the Ti compound is TiCl$_4$ and the Al alkyl compound is Al triisobutyl, Al triethyl, or Al(C$_2$H$_5$) (2,6-di-tert.-butyl-p-cresoxy).

24. Catalysts according to claim 1, in which the Mg dihalide is MgCl$_2$.

25. Catalysts according to claim 1, in which the Mg dihalide is MgBr$_2$.

26. Catalysts according to claim 15, in which the Mg dihalide is MgCl$_2$.

27. Catalysts according to claim 15, in which the Mg dihalide is MgBr$_2$.

28. Catalysts according to claim 1, in which the Ti compound is TiCl$_4$, the electron-donor compound is methyl-p-toluate, the Al alkyl compound is Al triisobutyl, Al triethyl or Al(C$_2$H$_5$)$_2$-(2,6-di-tert.-butyl-p-cresoxy) and the Mg dihalide is MgCl$_2$ or MgBr$_2$.

29. Catalysts according to claim 15, in which the Ti compound is TiCl$_4$, the Al alkyl compound is Al triisobutyl, Al triethyl, or Al(C$_2$H$_5$)$_2$-(2,6-di-tert.-butyl-p-cresoxy) and the Mg dihalide is MgCl$_2$ or MgBr$_2$.

* * * * *